(12) United States Patent
Dunstan et al.

(10) Patent No.: US 6,539,443 B1
(45) Date of Patent: Mar. 25, 2003

(54) BUS COMMUNICATION AND TRANSFER RATE NEGOTIATION SYSTEM

(75) Inventors: Robert A. Dunstan, Hillsboro, OR (US); Dale Stolitzka, Santa Clara, CA (US)

(73) Assignees: Intel Corporation, Santa Clara, CA (US); Analog Devices, Inc., Santa Clara, CA (US)

( * ) Notice: Subject to any disclaimer, the term of this patent is extended or adjusted under 35 U.S.C. 154(b) by 0 days.

(21) Appl. No.: 09/716,143

(22) Filed: Nov. 17, 2000

Related U.S. Application Data

(63) Continuation-in-part of application No. 09/132,844, filed on Aug. 12, 1998.

(51) Int. Cl.[7] .................................................. G06F 1/00
(52) U.S. Cl. ......................... 710/106; 710/110; 710/60
(58) Field of Search .................................. 710/126–129, 710/107, 110, 33, 34, 35, 36, 58, 61, 60, 106, 305, 306, 307, 310, 313, 314, 315; 709/263, 231, 232

(56) References Cited

U.S. PATENT DOCUMENTS

| | | | | |
|---|---|---|---|---|
| 5,237,676 A | * | 8/1993 | Arimilli et al. | 395/550 |
| 5,278,974 A | * | 1/1994 | Lemmon et al. | 395/550 |
| 5,491,814 A | * | 2/1996 | Yee et al. | 395/550 |
| 5,537,660 A | * | 7/1996 | Bond et al. | 710/58 |
| 5,559,967 A | * | 9/1996 | Oprescu et al. | 710/115 |
| 5,613,075 A | * | 3/1997 | Wade et al. | 710/107 |
| 5,625,847 A | * | 4/1997 | Ando et al. | 710/100 |
| 5,652,848 A | * | 7/1997 | Bui et al. | 710/129 |
| 5,761,533 A | * | 6/1998 | Aldere Guia et al. | 710/45 |
| 5,935,232 A | * | 8/1999 | Lambrecht et al. | 710/128 |
| 6,295,568 B1 | * | 9/2001 | Kelley et al. | 710/126 |
| 6,311,245 B1 | * | 10/2001 | Klein | 710/126 |
| 6,370,593 B1 | * | 4/2002 | Larson | 710/1 |

* cited by examiner

Primary Examiner—Xuan M. Thai
Assistant Examiner—Raymond N Phan
(74) Attorney, Agent, or Firm—Trop, Pruner & Hu, P.C.

(57) ABSTRACT

A first device and a second device may be coupled to a bus. The first and second devices drive signals on the bus to establish a bus speed for a given message and to arbitrate for bus access.

26 Claims, 5 Drawing Sheets

BUS COMMUNICATION AND TRANSFER RATE NEGOTIATION SYSTEM

This application is a continuation-in-part of U.S. patent application Ser. No. 09/132,844 filed Aug. 12, 1998.

BACKGROUND

The present invention relates to the field of communications between devices in a processor-based system and more particularly, to buses for communication between devices.

Data buses are found in virtually all computers and processor-based devices, serving to interconnect a processor to random access memory, or to enable communications between a processor and an application-specific integrated circuit (ASIC) or peripheral devices, as examples. Some of these data buses are single wire buses. Conventionally, single wire buses that support communication between multiple devices use a wired-or technique. Typically, the bus is held high by a pull-up resistor or other current source. When a device wishes to use the bus for communication, the bus is actually driven low. Single wire buses are usually used to transfer data between devices or to send a clock signal.

In some cases, devices operating on the same bus may be capable of operating at different speeds. In some systems devices simply start out at a slow speed and negotiate to a higher speed if possible. This may be ineffective because communication necessarily progresses at a speed which may be slower than either device is capable of operating at. More complex system may require complex negotiations to set the bus speed.

Thus, there is a need for a bus negotiation scheme which automatically adjusts the bus speed to accommodate for the communication capabilities of the devices coupled to the bus.

In addition, bus systems may have elaborate arbitration schemes for controlling access to the bus when more than one bus agent seeks to use the bus at one time. These schemes complicate bus operation and limit access to such a bus by bus agents with relatively limited resources.

Thus, there is also a need for improved ways of negotiating bus access.

DETAILED DESCRIPTION

A communication bus communicates information between devices coupled to the bus. The bus may be coupled in a point-to-point arrangement. Alternatively, the bus may be implemented as a fully discoverable bus. Device addresses may be assigned by the system or may be fixed. The bus may use a wide range of speeds, for example from under one kilohertz to rates well above one megahertz. The highest possible data transfer speed may be established for each message, in one embodiment of the invention. Devices coupled to the bus may receive power from the bus.

Embodiments of the present invention may implement a one wire serial bus. Such a bus may be useful, for example, in connection with hand held devices, appliances, small portable devices, such as cellular telephones, and mobile processor-based systems.

Figure 1:
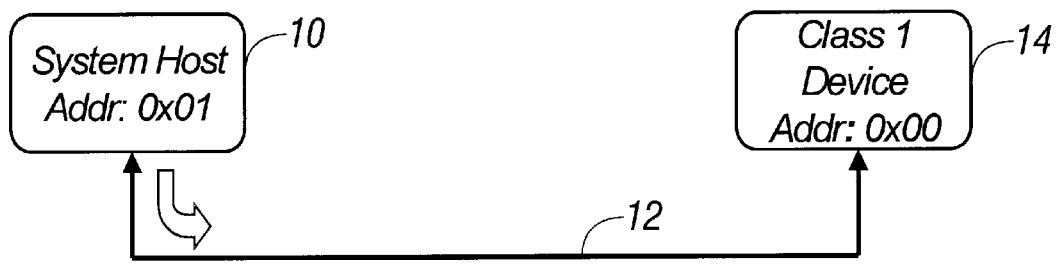
FIG. 1 is a block diagram of a Class 1 data bus system in accordance with one embodiment of the invention.

In a Class 1 data bus configuration, a single host (message originating device 10) communicates with a single client (message receiving device 14) over a bus 12, as shown in FIG. 1. A host is a device that may receive messages, initiate messages (as indicated by the open arrow) and evaluate messages. A client is a bus device other than the host. Default address 0x00 may be provided for the client and 0x01 for the host. The host originates messages in a Class 1 system. A Class 1 system uses point-to-point communications.

Figure 2:
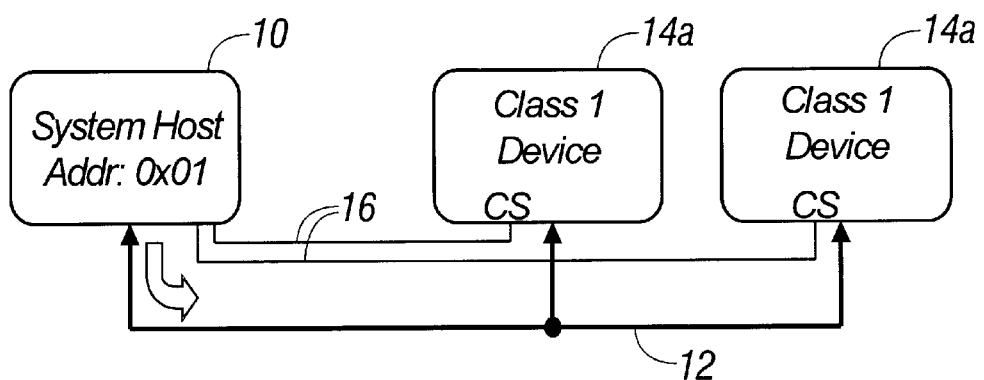
FIG. 2 is another embodiment of a Class 1 system in accordance with one embodiment of the invention.

Multiple clients 14a can be also be accommodated in a Class 1 configuration as shown in FIG. 2. Only one client is active at a time; however, client select lines 16 are coupled to respective clients and toggled to enable a particular client 14a to communicate with the host 10.

A bus speed negotiation scheme may establish a bus speed prior to every message in one embodiment of the invention. This may allow clients having different communication speeds to be coupled to bus 12, and may allow the bus speed to be automatically adjusted to accommodate those diverse clients.

Figure 3:
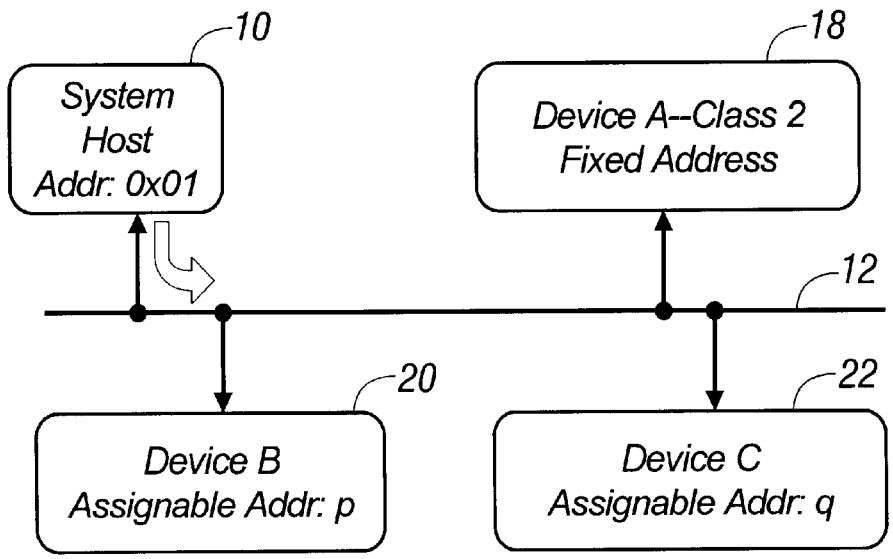
FIG. 3 is a block diagram of a Class 2 data bus system in accordance with one embodiment of the invention.

A Class 2 bus configuration, as shown in FIG. 3, uses a single host 10 and three clients 18, 20 and 22 in one embodiment of the invention. In a Class 1 or Class 2 bus configuration, there is typically only one host which can originate messages and enumerate device addresses. Class 2 devices may have static or fixed addresses (as indicated for the client 18) that are fixed at the time of manufacture, by pin strapping or other techniques. Other devices (20, 22) may be assignable address devices that are assigned an address by the system at run time. The devices 20, 22 may start with a default address (0x0).

Figure 4:
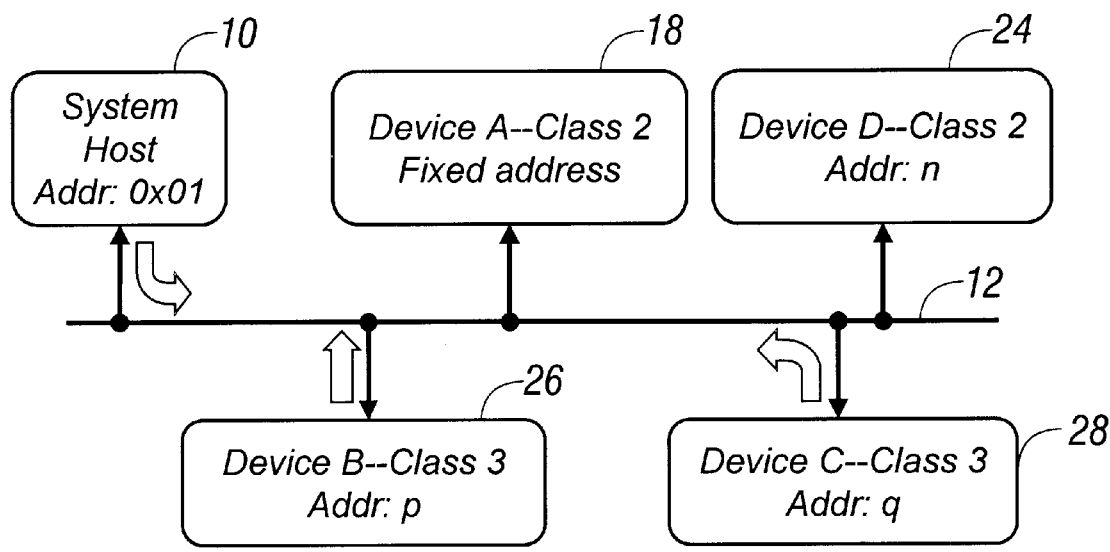
FIG. 4 is a combination block diagram of a Class 3 data bus system in accordance with one embodiment of the invention.

In a Class 3 data bus system more than one bus device is allowed to originate messages as shown in FIG. 4. This configuration includes the message originating devices 10, 26 and 28 and message receiving devices 18 and 24 in one embodiment of the invention. However, to avoid bus contention problems, only one of the multiple originators is active at any one time. This configuration is useful, for example, if one or more of the multiple originators is not present for some reason—by being disabled or physically disconnected, for example—since the bus can still operate due to the presence of the remaining active originator.

Figure 5:
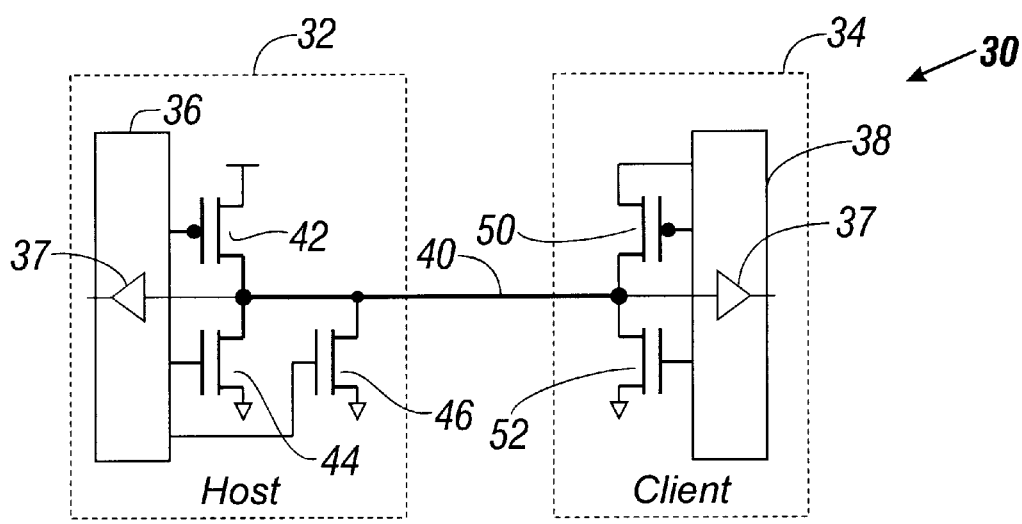
FIG. 5 is a schematic diagram of a system in accordance with one embodiment of the invention.

A data bus system may use a bus speed negotiation scheme that automatically establishes a common bus speed for all devices on the bus, as shown in FIG. 5. A data bus 40 interconnects a message originating device 32 and a message receiving device 34. The host or originating device 32 drives the bus with two field effect transistors 42 and 44, arranged such that turning on transistor 42 drives the bus 40 to a logic "high" or "1" state, while turning on transistor 44 pulls the bus down to a logic "low" or "0" state, in one embodiment of the invention. The originating device 32 also includes a receiver 37, coupled to the bus, that senses the bus logic state and conveys it to a bus control circuit 36. The bus control circuit 36 is also coupled to the gates of transistors 42 and 44, and produces the signals needed to turn these transistors on and off. A third field effect transistor 46 may be coupled to the bus 40 to pull down the potential on the bus 40. The transistor 46 operates as a switched idling load device. The transistor 46 may be replaced with a large resistor or omitted in some cases.

The client or receiving device 34 also includes two field effect transistors 50 and 52 which drive the bus 40 in the same manner as the transistors 42 and 44, respectively, and a receiver 37 for sensing the state of the bus. A bus control circuit 38 receives the output of receiver 37 as an input, and outputs control signals to turn transistors 50 and 52 on and off.

The data bus 40 carries messages from one device to another, with the content of the messages conveyed as a series of data bits. Each data bit is allotted a particular window of time, called a "bit time," in which to convey its logic state ("1" or "0"). The bus speed is directly related to the bit time. A short bit time provides a faster bus speed that permits more bits to be conveyed in a given period, while a longer bit time reduces the bus speed, and thereby the amount of data that can be conveyed during the same time period.

A device that is driving data onto the bus may read back the values it drove onto the bus. If the device drives a logic high, but a logic low has been established on the bus, then it has detected a collision with another device and one device may discontinue any bus activity. If at least one device asserts a one (maintains the line high) and another device asserts a zero (pulls the line low), the device that asserts the zero is allowed to continue and the other device releases or surrenders ownership of the bus, in one embodiment of the invention.

For instance, with respect to collision avoidance, each host monitors the activity on the bus and if a host sees a transaction on the bus, that host does not drive the bus. Hosts may take steps to resolve collisions as well. If a host believes that a bus is not busy after monitoring the bus without seeing any transactions, the host may assert a logic one to obtain ownership of the bus by driving the bus high.

If multiple originators drive the bus the same way (high or low), at the same time, each originator may not be aware that a collision has occurred because they both may be under the impression that the information they read back from the bus is the information they drove onto the bus. The originators monitor each bit that is driven onto the bus. Any time an originator sees that a logic low was established on the bus when it has driven a logic high, indicating that a collision has occurred, that originator releases the bus. The originator releasing the bus, in effect, relinquishes ownership of the bus to the other originators. Since the originators have all been driving bits onto the bus with the same logic state, no incorrect data has been driven or received by any device.

Clients are typically addressed. Therefore, clients monitoring the bus for their addresses may determine whether the data on the bus is directed to them. However, if multiple clients are selected at the same time, and those clients are reading the bus, each client monitors what information it has driven on the bus and determines whether there is a conflict. This dictates how resolution will occur. For instance, if an originator sends out a logic one asking for data from the client as part of a read operation, the first phase of the clock will be driven high. During the second phase, the client may leave the bus high to assert a logic one or pull it low to assert a logic zero. If a first client leaves the bus high, while the second client pulls the bus low, the first client, on observing that the bus is low, releases the bus. If both the clients are providing the same value, it does not matter whether either one releases the bus since both are driving correct data. In other words, either device may continue to drive the bus until there is a collision (when wrong data appears) because the information transferred prior to the collision is the same.

Figure 6:
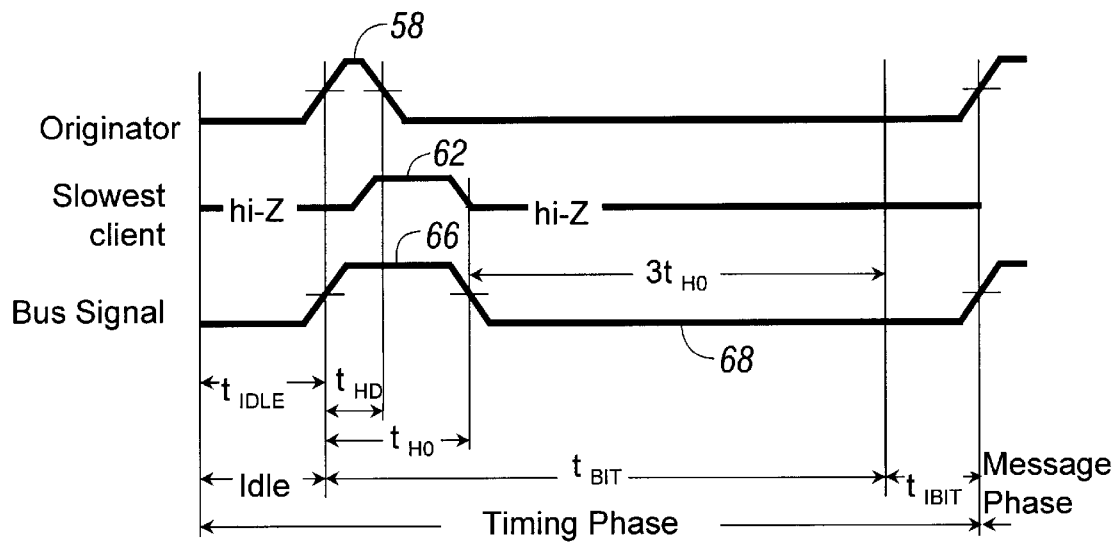
FIG. 6 is a speed negotiation timing diagram for the data bus system of FIG. 5.

The data bus 40 may provide for a variable bit time, with the bit time for a given message established prior to transmission, based on the communication capabilities of all the bus devices that are both coupled to the bus and enabled to receive the upcoming message. In FIG. 6, the message originating device (originator) 32 places a logic pulse 58 onto the bus 40 for time $t_{HD}$. The pulse 58 is toggled from a low to a high logic state by turning on transistor 42, which, as reflected by the bus signal waveform 66, causes the bus 40 to toggle to a logic high state. The receiver 37 in the slowest message receiving device (slowest client) 34 senses the occurrence of pulse 58, and responds by driving a logic pulse 62 onto the bus 40. In one embodiment of the invention, each client responds by driving the bus high for about one-quarter of its optimal bit rate.

The pulse widths of pulses 58 and 62 represent the bus speeds proposed by their respective pulse generating devices (originating device 32 and receiving device 34, respectively). The bus speed that is established between devices 32 and 34 is the slower of the two proposed speeds as indicated by their respective pulses 58 and 62. Adopting the slower speed insures that both devices are capable of reading a message conveyed between them.

To determine the bus speed that is to be adopted, both the originating device 32 and the slowest receiving device 34 measure the elapsed time between the "start" of pulse 58 (i.e., its rising edge) and the "end" of either pulse 58 or pulse 62 (i.e., their respective falling edges), whichever occurs last. The bus remains high until the slowest client releases the bus signal by turning off its transistor 50. If the end of pulse 58 occurs last, or if no receiving devices respond, the bus speed simply defaults to the speed proposed by the originating device 32. However, if the end of pulse 62 occurs last, the bus speed is made equal to the time ($t_{HO}$) proposed by the slowest receiving device 34. The fact that pulse 62 ends last indicates that the receiving device communicates at a lower speed than that proposed by the originating device, and the speed negotiation scheme thus insures that the bus speed is low enough to accommodate the slowest device.

The elapsed time described above may be measured by arranging the originating and receiving devices 32 and 34 so that the bus signal waveform 66 is toggled high at the start of pulse 58, and remains high until toggled low at the end of pulse 58 or pulse 62, whichever occurs last. The bus signal waveform 66 is conveyed to bus control circuits 36 and 38 via their respective receivers 37, informing both originating and receiving devices of the negotiated bus speed.

The message phase may follow immediately after negotiated timing-phase. The time $t_{IBIT}$ depicts the allowed amount of delay between the end of one bit and the beginning of another bit in a message or between the speed negotiation phase and the message phase. The time $t_{IDLE}$ is the idle time before beginning the speed negotiation portion of the timing phase.

The bus signal waveform 66 may be toggled by bus driving transistors having different drive currents. In message originating device 32, for example, each of the transistors 42, 44 and 46 may have a different drive current, with transistor 44 being the strongest ("strong"), followed by transistor 42 ("weak"), and transistor 46 being the weakest ("very weak"). Similarly, the transistors of message receiving device 34 may be arranged such that the drive current of the transistor 50 is about equal to that of transistor 42, and the drive current of transistor 52 is about equal to that of transistor 44.

The originator 32 uses transistors 42 and 44 to toggle the bus to a logic "1" and logic "0" state as needed to convey the data bits of a message, and device 34 uses transistors 50 and 52 for this purpose. Making the drive currents of transistors 44 and 52 stronger than those of transistors 42 and 50 provides a bus contention scheme: if an originating device wants to prematurely abort a message transfer, it can do so by turning on the "strong" transistor 44 to pull the bus down to a logic "0", even if a receiving device is trying to drive a logic "1" with the "weak" transistor 50.

Transistor 46 has a "very weak" drive current, so that it can be overcome by the "weak" drive current of logic "1"-creating transistor 50. As noted above, pulse 58 is toggled high by turning on transistor 42. When pulse 58 falls, originating device transistor 46 is turned on to pull the bus towards a logic "0" state with its very weak drive current. In response to pulse 58, receiving device transistor 50 is turned on to apply logic pulse 62 to the bus 40. The "weak" drive current of transistor 50 is made greater than the "very weak" drive current of transistor 46 to enable the bus signal waveform 66 to accurately reflect the elapsed time described above. With its drive current greater than that of transistor 46, transistor 50 establishes the level on the bus; i.e., the bus will go to the low logic state. Thus, if pulse 62 is still at a logic "high" state when the pulse 58 falls, a "high" produced by transistor 50 overcomes the "low" due to transistor 46 and the bus remains at a logic high state.

When a pulse 62 ends, the receiving device 34 may "release" the bus by putting its drivers into a high impedance state 64, rather than by actively pulling the bus low. By doing so, the earliest that the bus will be pulled down to a logic "low" (signaling the end of the elapsed time) is when the transistor 46 turns on at the end of pulse 58. Thus, if pulse 62 ends (by entering the high impedance state) before pulse 58, the bus remains "high" until the end of pulse 58.

In FIG. 6, the pulse 66 toggles "high" at the start of pulse 58. The composite bus signal 66 toggles "high" in response to pulse 58, but then releases the bus before the end of pulse 58 when the receiving device 34 puts its drivers into a high impedance state 64. The waveform 64 then falls to a logic "low" when pulse 58 ends and transistor 46 turns on.

The pulse width $t_{HO}$ (at 50% of the pulse amplitude) that results from the above-described bus speed negotiation sequence can be translated into a bus speed in any number of ways. One convenient way of doing so is by defining the bus "bit time" ($t_{BIT}$) as an integral multiple N of the measured pulse width $t_{HO}$. For example, the bit time $t_{BIT}$ may be set equal to four times $t_{HO}$. The multiplier N is constant, so that $t_{BIT}$ is easily derived regardless of the negotiated speed.

Figure 7:
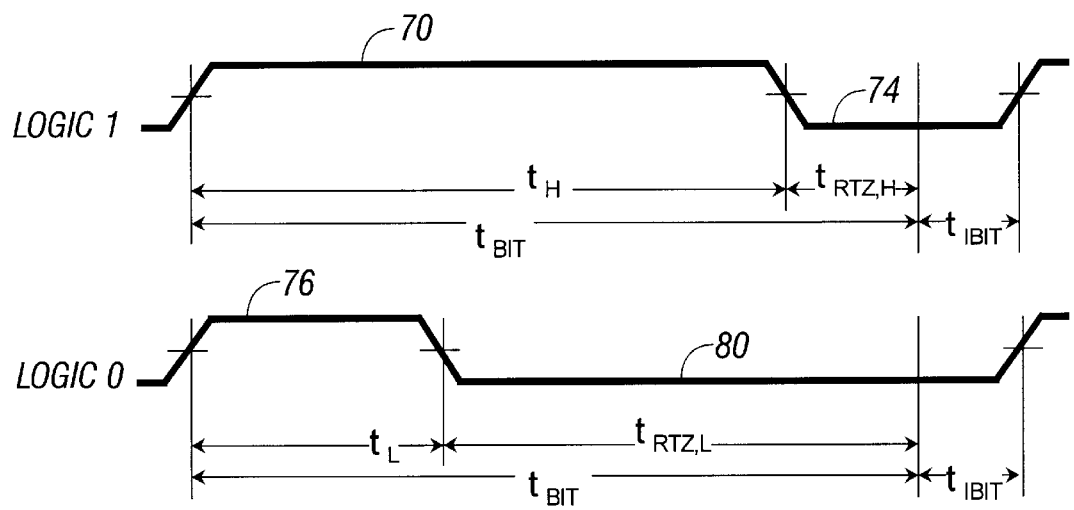
FIG. 7 is a timing diagram for the write protocol in accordance with one embodiment of the invention.

In one embodiment of the invention, a logic "0" and a logic "1" are defined using a combination of timing and DC voltage levels, as shown in FIG. 7. Each logic state is a ratio of the amount of time $t_H$ that the bus is at a high signal level 70 or 76 (i.e., when the bus is at a DC voltage greater than a defined minimum), to the amount of time ($t_{RTZ}$) that the bus is at a low signal level 74 or 80 (bus voltage less than a defined maximum) within the defined bit time $t_{BIT}$. For example, a logic "1" may be defined as having a ratio $t_H/t_{RTZ}=3$. Correspondingly, a "0" may have a ratio $t_H/t_{RTZ}=1/3$. That is, if the bus is at a signal high for 1/4 of a bit time $t_{BIT}$, and is low for 3/4 of $t_{BIT}$, $t_H/t_{RTZ}=1/3$, representing a logic "0".

For example, if the desired $t_H/t_{RTZ}$ ratio definitions are 3 and 1/3, and the desired maximum bus speed is 10 kHz, $t_{BIT}$ equals 1/10 kHz=100 microseconds. The message originating device should then produce a pulse 58 having a pulse width equal to 25 microseconds (i.e., $t_{BIT}$ is high for one 25 microseconds period and low for three 25 microseconds periods) to establish 10 kHz as the default bus speed.

The bus speed negotiation scheme is not limited to these particular methods of deriving $t_{BIT}$, or to the use of the mentioned $t_H/t_{RTZ}$ ratios to define logic states. Nor is the bus speed negotiation scheme limited to the ratios of 3 and 1/3 discussed above although these values may be advantageous because they allow for a simple and efficient integer-math microcode implementation. Lower ratios (2 and 1/2) would provide greater bus bandwidth, while higher ratios would provide better noise immunity and robustness. Lower or higher ratios may be the use less efficient microcoding.

Referring back to FIG. 5, an example that may provide a good balance between noise immunity and transistor sizing differences uses transistors 44 and 52 having about 10 times the drive current of transistors 42 and 50, which in turn have about 10 times the drive current of transistor 46. For example, transistors 44 and 52 may have drive currents of about 1 milliamp, creating what is referred to as a "strong low" when on, transistors 42 and 50 may have drive currents of about 100 microamperes each (creating a "weak high" when turned on), and transistor 46 may have a drive current of about 10 microamperes (creating a "very weak low" when on). These drive current differences result in a logic "1" when the bus 40 is driven to at least 2.4 volts, and a logic "0" when the bus is pulled down to 0.6 volts or less. The receivers 32 then define a "1" as +2 volts and a "0" as +1 volt, providing a noise margin of about 1 volt. Other factors to be considered when defining these logic states include the amount of integrated circuit area that can be allotted to the driving transistors (because their respective drive currents are directly related to their physical size), and the capacitance of the bus.

Referring to FIG. 7, for a logic one write command, the originator drives the bus high for three-quarters of the agreed bit time ($t_{BIT}$) as indicated at 70 followed by a low level (indicated at 74) for one-quarter of the agreed bit time. For a logic zero, the bus is driven high for one-quarter of the agreed bit time as indicated at 76 followed by a low for three-quarters of the bit time or indicated at 80.

Figure 8:
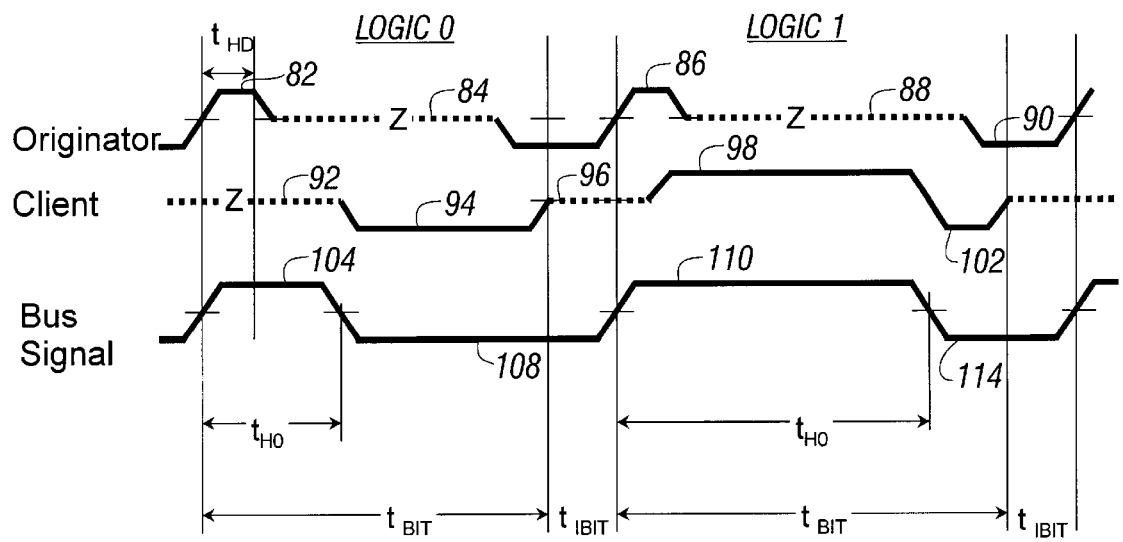
FIG. 8 is a timing diagram for the read protocol in accordance with one embodiment of the invention.

For a logic one read command, the originator releases the bus after $t_{HD}$ (as indicated at 86) and the client holds the three-quarter bit time (as indicated at 98) with its own bus drivers, as shown in FIG. 8. The signal 110 is established on the bus. For a logic zero read command, the originator releases the bus after $t_{HD}$ (as indicated at 82) and the client holds the one-quarter bit time (as indicated at 104) with its own bus drivers. The signal 104 is established on the bus.

Figure 9:
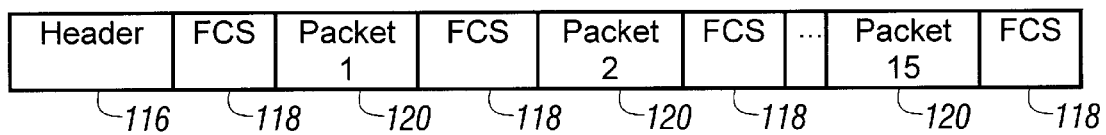
FIG. 9 shows the packet structure in accordance with one embodiment of the invention.

As shown in FIG. 9, the messaging protocols for devices on the bus may include a byte header block 116 and variable length data blocks 120 that are evenly divisible into predetermining byte sized packets, in one embodiment of the present invention. The header 116 may arrange information into five fields that convey the information about the message being sent, including the data block length. Each data packet 120 and the header 116 includes a check byte 118, as the last byte of the packet. Data may be padded with trailing bytes to fill the fixed length data packets.

Each transaction uses a check byte calculation by both the originator and receiver within each packet. The check byte may use an eight-bit cyclic redundancy check (CRC-8) of each data packet or header block. The frame check sequence (FCS) is calculated in any way that conforms to a CRC-8 represented by the CRC polynomial, $C(x)=x^8+x^2+x^1+1$.

The FCS is read back from the receiving client to the originator. In this way, the originator knows within an atomic operation if a write is successful or a read is received correctly.

A variety of addressing protocols may be utilized. As one example, a four bit device address is described. Other protocols may be utilized including, for example, an eight bit addressing protocol. The addressing protocol may divide the address space into fixed device addresses and dynamic device addresses. If a device has no address or loses its address, that device takes on a default address. The default address is 0x0, the host address is 0x1, and static address devices take addresses 0x4 through 0x7 while dynamic address devices take addresses 0x7 through 0xf in one embodiment of the invention. In Class 2 or Class 3 systems, multiple devices with the default address may occur during the bus enumeration cycle. Generally, only one device at a time may be present at any other static address. The static addresses are presumed as fixed in hardware and unchangeable. The system addresses are assigned by the host which is responsible for maintaining them without overlap.

Figure 10:
FIG. 10 illustrates the header structure for the header shown in the embodiment of FIG. 9.

Referring to FIG. 10, a basic four-bit header block may be used for bus communications in one embodiment of the invention. The FCS field 156 is a response from the addressee. Each byte is arranged from most significant bit on the left to least significant bit on the right. The command field 150 is defined by the device type. The subcommand field 152 may be a four bit field 150 and the most significant bit of this field may define the command direction, e.g. read equals zero and write equals one. The remaining three bits of the field may be used in the read protocol when a pointer or some packet of data is needed for the responding client to send data back to the originator. A common example for such a command field is a memory read. In this example, the subcommand 152 is a memory address where the read begins. The read back of the memory takes the length from the length field 154. In effect, the subcommand field 152 may be a pointer, a second level on the command field 150 or may be used to extend the range of commands to seven bits. In the write protocol, the subcommand field 152 is useful to extend the command range to seven bits. The length field 154 may take any value from zero to fifteen (0xf) and signals the number of data packets to be sent or received after the header.

Figure 11:
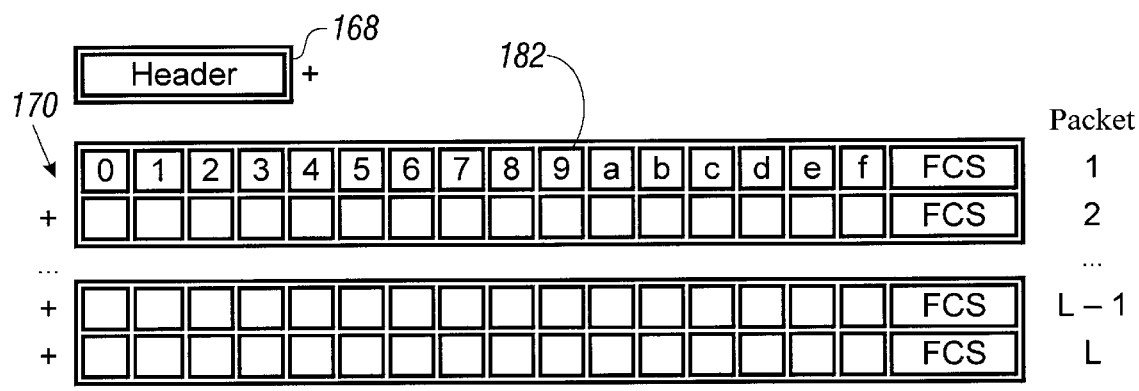
FIG. 11 shows the data block structure used for both read and write protocols in one embodiment of the invention.

In FIG. 11, a write command with L number of data packets 172 in the data block 172 is illustrated. The data block includes a header 168 and packets 170 from one to L.

In the read protocol, also shown in FIG. 11, the header block 168 begins the message and is always sent by the message originator. If the bus has Class 1 clients, only the bus host may send a header block. One or more 16 byte packets represent the data block. If there is not enough significant data to fill the packet, padding is added to fill sixteen data bytes before the FCS byte. The header may call for a larger number of packets than is available at the client. In this situation, the client returns packets filled with 0x00 until the requested length of packets is complete.

An address resolution protocol (ARP) may include the commands to send a global Reset( ) and SetAddress( ) commands. The command sequences to discover devices on the bus are to send a Discover( ) command to find all dynamically addressable devices and to send a sequence of GetDIB( ) commands to all fixed addresses ranging between 0x04 and 0x1f. Class 2 and 3 devices use Discover( ), SetAddress( ) and GetDIB( ) commands. The Discover( ) command returns a list of all dynamically addressable devices on a logical segment.

The SetAddress( ) command configures the device address from a predefined default address to a new address. The device holds the address as long as defined within manufacturing parameters or until a Reset( ) command is received. The SetAddress( ) command is sent to the default address and therefore no device is affected that has a non-default address.

The GetDIB( ) command targets any previously assigned device address in the dynamic address range. Any such devices respond with unique information that identifies itself. The GetDIB( ) function returns a string of data containing device identification information.

A Reset( ) function may be implemented in two ways. The physical layer reserves two reset functions. One is directed at a particular address, the directed reset, and one is sent to the default address called the global reset. The directed reset function causes a targeted device to reset its function and its address to the power-on state. If the device is capable of storing a persistent address through some non-volatile mechanism, the persistent address is maintained. Dynamic addresses that can not keep an address through a power-on must take the default address. The global reset causes all dynamically addressable devices on the logical bus to take on their power-on state and take the default address. The global reset function is normally used just prior to bus enumeration. Fixed address devices, including Class 1 default address devices, reset to their power-on state for either directed or global reset.

Though only field-effect transistors (FETs) have been depicted in the implementation of the data bus system, the invention is not limited to the use of FETs. Other types of switches, relays or devices, may also be used. Also, the bus speed negotiation schemes described herein are not limited to a one wire bus. They are also applicable to multi-wire buses.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method comprising:
   driving a first signal on a bus, said first signal having a duration indicative of the speed of a first bus device;
   during said first signal, driving a second signal on said bus, said second signal having a duration indicative of the speed of a second bus device; and
   determining a bus speed based on the duration of the signal established on said bus as a result of said first and second signals.

2. The method of claim 1 further including producing said second signal in response to said first signal.

3. The method of claim 1 further including causing said first and second signals to overlap to produce a composite signal having a duration, measuring the duration of said composite signal and using the duration of said composite signal to determine the bus speed for communications on said bus.

4. The method of claim 1 wherein driving said second signal includes driving said second signal on said bus in response to said first signal.

5. The method of claim 1 wherein determining includes selecting the longer of said first and second signals to determine the bus speed.

6. A method comprising:

driving a first signal on a bus from a first bus device;

driving a second signal on said bus from a second bus device; and causing one of said signals to alter the other of said signals including altering one signal when the other signal is driven more strongly.

7. The method of claim 1 including producing logic signals represented by pulses having a high level and a low level, the duration of said high level being greater than the duration of said low level for one of said logic signals and the duration of said low level being longer than the duration of said high level for the other of said logic signals.

8. The method of claim 7 wherein causing includes causing a low level to dominate over a high level.

9. The method of claim 7 including providing one of said logic levels with a stronger current drive than the other of said logic levels so that when said logic levels overlap, the logic level produced with a stronger current device is established.

10. The method of claim 9 including producing one of said logic levels using a transistor having a higher drive current than a transistor producing the other of said logic levels.

11. A method comprising:

driving a first signal on a bus from a first bus device;

driving a second signal on said bus from a second bus device;

causing one of said signals to alter the other of said signals; and detecting whether a signal driven by a bus device is established on said bus and causing one of said first and second bus devices to release said bus in response to the detection that a signal produced by said bus device did not result in that signal being established on the bus.

12. A bus device capable of being coupled to a bus comprising:

a driver to drive a signal on the bus, said signal having a duration indicative of the speed of said device;

a receiver to detect the duration of a signal resulting on the bus as a result of the signal driven on the bus by said bus device;

a bus, said device coupled to said bus; and a second bus device coupled to said bus, one of said bus device and said second bus device acting as a host and the other of said bus devices acting as a client.

13. The device of claim 12 wherein said bus is a single wire bus.

14. The device of claim 13 wherein said bus supplies power to said device.

15. The device of claim 12 wherein said driver drives said signal in response to a second signal produced on said bus by said second bus device.

16. The device of claim 12 wherein said receiver determines bus speed based on the duration of the signal established on said bus as a result of signals driven by said bus device and said second bus device.

17. A bus device comprising:

a driver that drives a first signal on said bus wherein said driver drives a high logic signal by driving a pulse having a high level and a low level, said high level having a longer duration than said low level, and said driver drives a low logic signal by driving a pulse with high and low levels, said high level having a shorter duration than said low level; and a receiver that detects the resulting signal on said bus and causes said bus device to release said bus if a signal driven on said bus by said bus device is not established on said bus.

18. The device of claim 17 wherein said driver includes a first driving element that drives said bus to a high level and a second driving element that drives said bus to a low level.

19. The device of claim 18 wherein said first driving element is weaker than said second driving element.

20. A system comprising:

a bus;

a first bus device coupled to said bus;

a second bus device coupled to said bus;

each of said bus devices including a driver to drive a signal on said bus that overlaps with the signal from the other device, each of said signals having a duration indicative of the speed of the device that drove said signal; and a detector that detects the duration of the signal established on said bus as a result of said signals driven by said first and second bus devices.

21. The system of claim 20 wherein each of said first and second bus devices release the bus after driving a signal on said bus which is not established on said bus.

22. The system of claim 21 wherein said driver produces low and high level signals, one of said level signals being driven more strongly than the other of said level signals, such that when a more strongly driven level signal overlaps on said bus with a less strongly driven level signal, the more strongly driven level signal is established on said bus.

23. A bus device comprising:

a driver that drives a first signal on said bus, wherein said driver includes a pull up transistor and a first pull down transistor, said transistors being field effect transistors; and a receiver that detects the resulting signal on said bus and causes said bus device to release said bus if a signal driven on said bus by said bus device is not established on said bus.

24. The device of claim 23 including a second pull down transistor.

25. The device of claim 23 wherein said pull up transistor is weaker than said first pull down transistor.

26. The device of claim 23 wherein said second pull down transistor is weaker than said first pull down and said pull up transistors.

* * * * *